United States Patent

Zawodny et al.

[11] Patent Number: 5,832,322
[45] Date of Patent: Nov. 3, 1998

[54] PHOTOGRAPHIC CAMERA WITH A FRAME COUNTER IN THE BACK

[75] Inventors: Arthur Zawodny, Tsing Yi Island; Franco Yik Kai Chung, N. T. Hong Kong, both of Hong Kong

[73] Assignee: Concord Camera Corp., Avenel, N.J.

[21] Appl. No.: 713,830

[22] Filed: Sep. 13, 1996

[51] Int. Cl.[6] .................................................. G03B 17/36
[52] U.S. Cl. ........................ 396/284; 396/387; 396/399
[58] Field of Search .................................. 396/284, 285, 396/387, 395, 397, 399, 411

[56] References Cited

U.S. PATENT DOCUMENTS

| | | | |
|---|---|---|---|
| 2,213,741 | 9/1940 | Mihalyi | 396/284 |
| 3,511,153 | 5/1970 | Steisslinger et al. | 95/31 |
| 3,752,050 | 8/1973 | Wolfe | 95/31 |
| 4,211,479 | 7/1980 | Zawodny | 354/213 |
| 4,397,535 | 8/1983 | Harvey | 354/212 |
| 4,492,446 | 1/1985 | Zawodny et al. | 396/284 |
| 4,671,636 | 6/1987 | Malloy Desormeaux | 396/284 |
| 4,707,096 | 11/1987 | Lawther | 354/215 |
| 4,746,943 | 5/1988 | Kohl | 354/215 |
| 4,804,987 | 2/1989 | Arai | 354/219 |
| 4,839,678 | 6/1989 | Zawodny et al. | 354/217 |
| 4,972,649 | 11/1990 | Mochida et al. | 53/430 |
| 5,063,400 | 11/1991 | Takei et al. | 354/288 |
| 5,410,380 | 4/1995 | Kawamura et al. | 354/213 |
| 5,452,036 | 9/1995 | Kamata | 354/275 |
| 5,453,808 | 9/1995 | Zawodny et al. | 354/212 |
| 5,555,053 | 9/1996 | Stephenson, III | 354/206 |

*Primary Examiner*—Eddie C. Lee
*Attorney, Agent, or Firm*—Woodcock Washburn Kurtz Mackiewicz & Norris LLP

[57] ABSTRACT

A camera includes a main body having a first cavity for receiving a film cartridge and a second cavity for receiving film withdrawn from the film cartridge, a metering apparatus mounted within the main body for metering the film, one frame at a time, between the first and second cavities and across a film exposing area, a back cover covering the first and second cavities and the film exposing areas, the metering apparatus having a member that projects toward the back cover when the film is metered and an indexable film frame counter disposed on the back cover and having frame number indicia viewable by a user via a window in the back cover. The frame counter being engageable by the member when the film is metered and indexing in response thereto to display a next frame number.

24 Claims, 10 Drawing Sheets

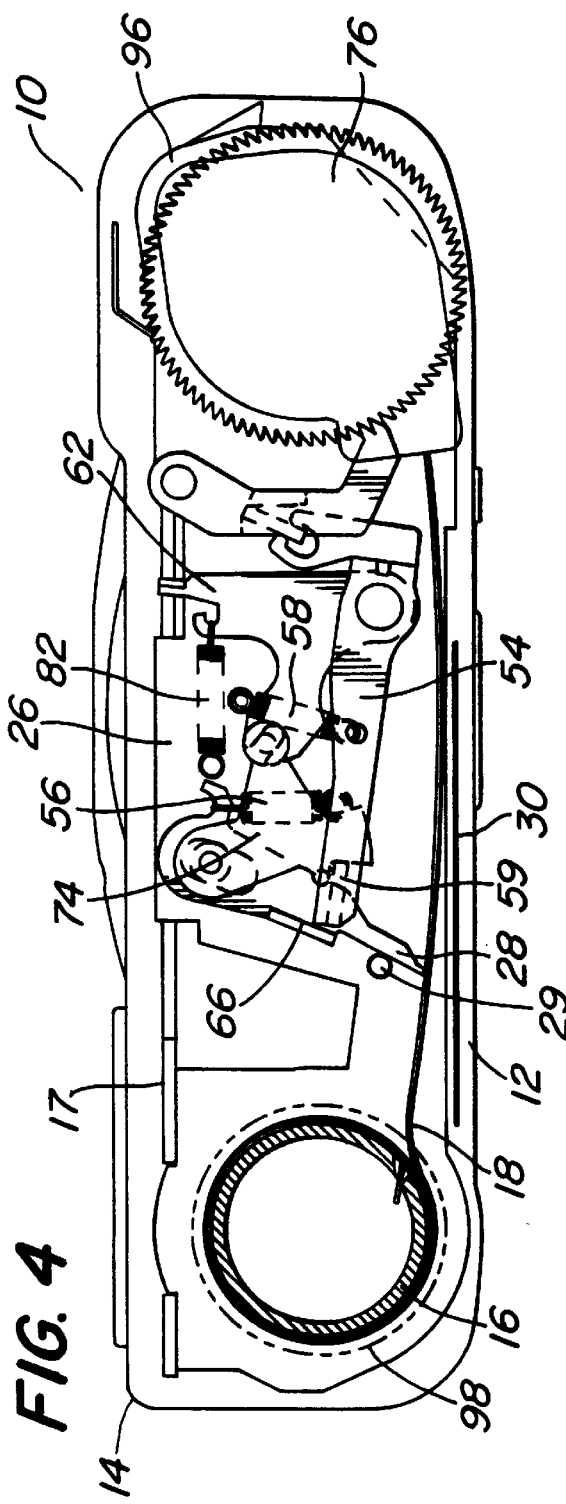
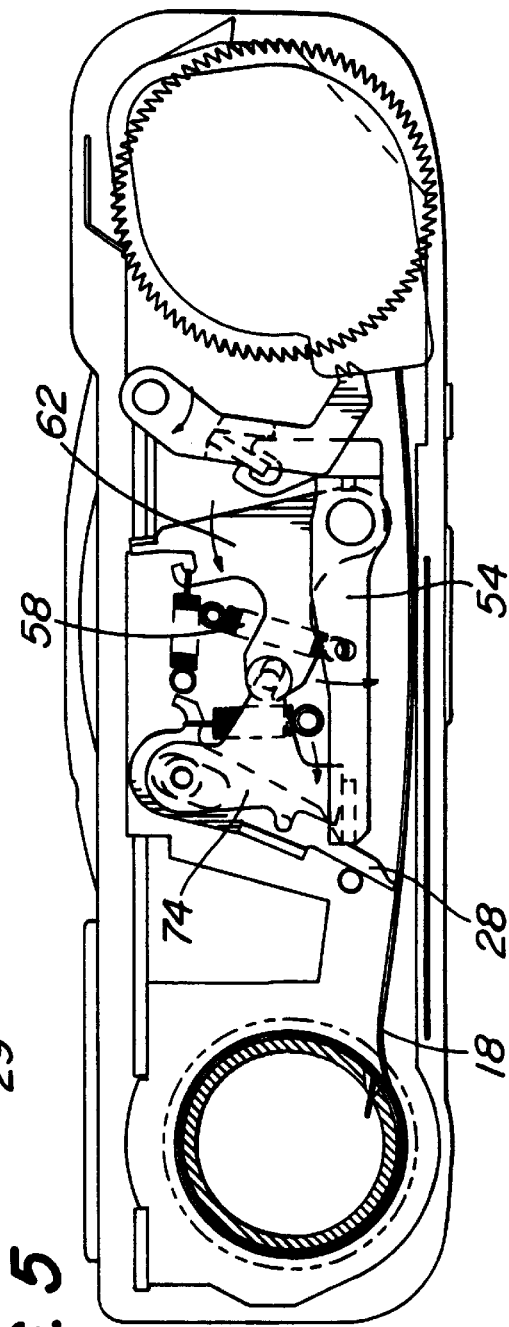
FIG. 4
FIG. 5

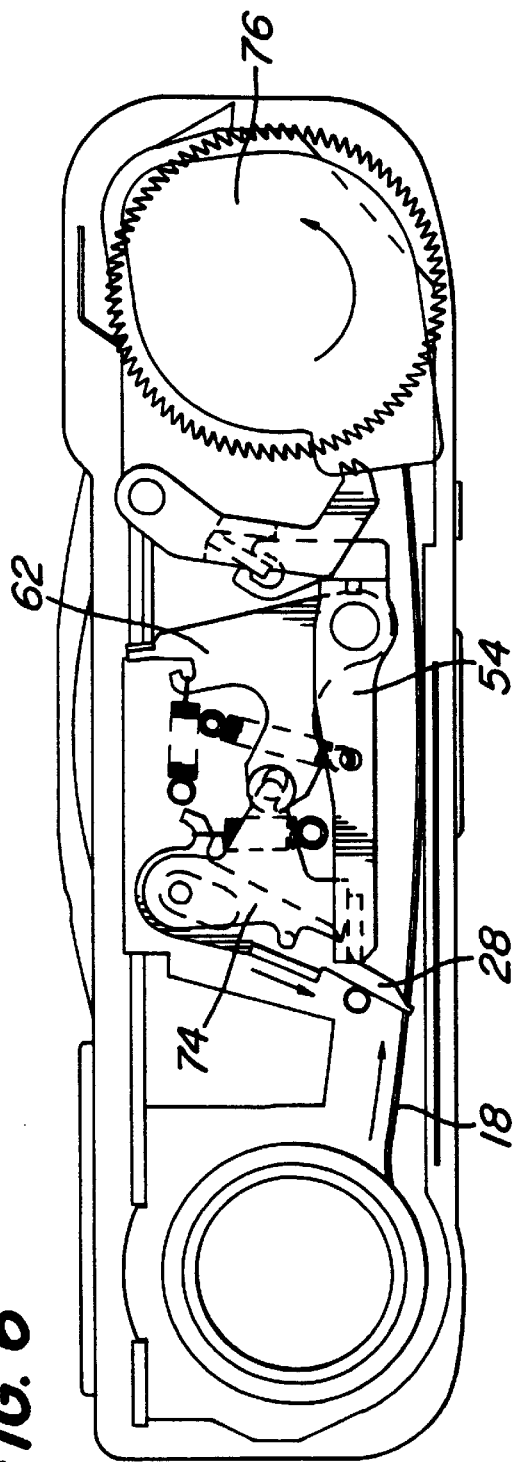
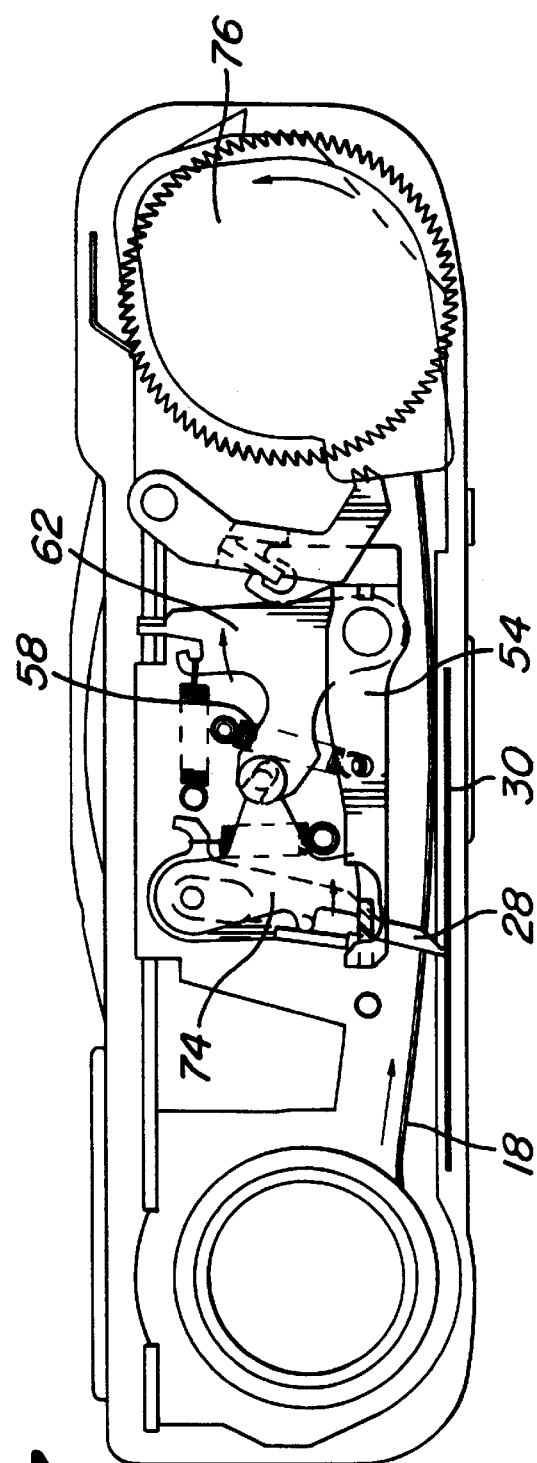
FIG. 6
FIG. 7

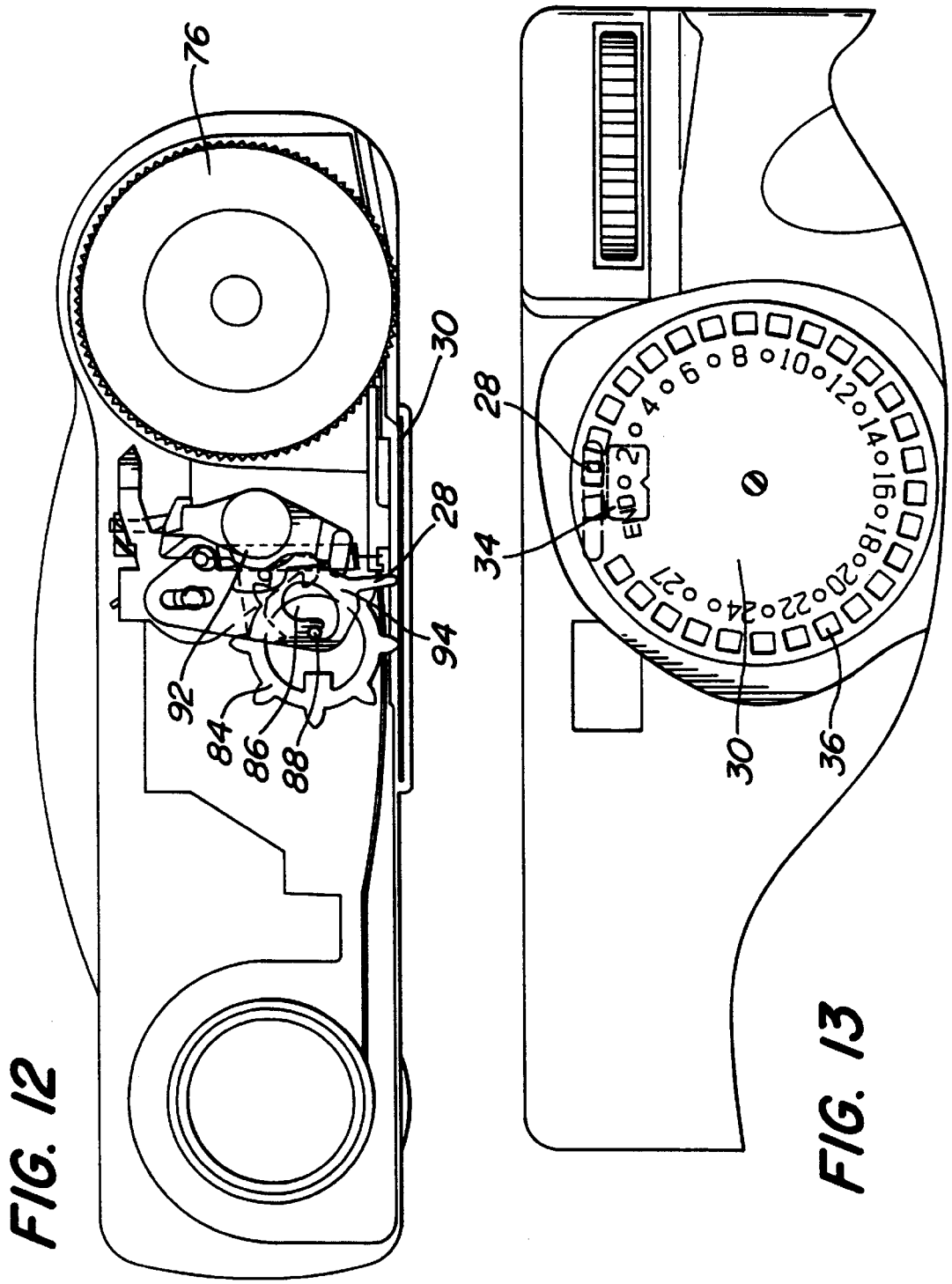

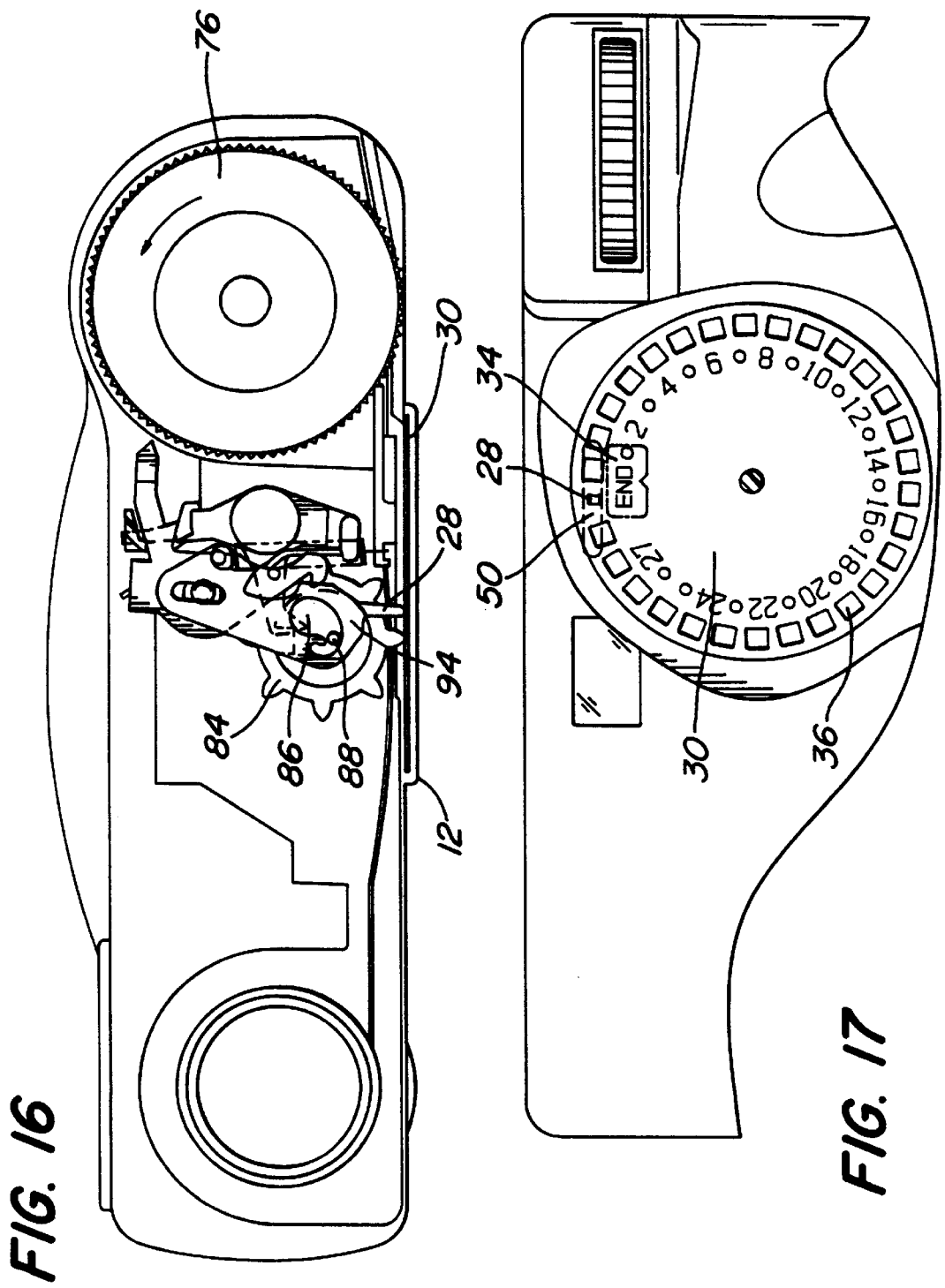

PHOTOGRAPHIC CAMERA WITH A FRAME COUNTER IN THE BACK

FIELD OF THE INVENTION

This invention relates to a photographic camera and more particularly to a camera that uses a metering system to drive a film frame counter that is located in the back of the camera.

BACKGROUND OF THE INVENTION

As is well known in the art, photographic cameras employ film that consists of a number of frames, and most cameras have a means for counting the number of frames used. Each frame corresponds to a picture. In a typical camera, after a picture is taken the film is advanced one frame to a film cartridge by a frame advancing apparatus. In some cameras the frame counting means is driven directly by the advancing apparatus. More particularly, after a picture is taken film is advanced to a film cartridge by operating an advance wheel. While the film is being advanced, the advance wheel then directly drives the counting means to indicate that another picture has been taken. In these cameras, the counting means measures the movement of the advancing apparatus, not the actual movement of film.

In contrast to these cameras, some other cameras have a counting means that is driven by a metering apparatus that measures actual film movement, not merely the movement of the advancing apparatus. In these cameras the advancing apparatus also advances the film to a film cartridge after a picture has been taken. As the film is driven, the film then drives the metering apparatus which drives the counting means. Thus, in a typical camera employing a metering apparatus, an advancing apparatus advances one frame of film to a film cartridge after a picture is taken, and a metering apparatus then measures the movement of one frame of film and drives the counting means to indicate one picture has been taken.

Film frame counters are typically located in either the top of a camera or in the back of a camera. In either location, the counters are usually driven in one of the two methods described above. By locating a frame counter in the back of a camera, the counter can be easily seen while taking a picture. Consequently, some consumers consider a frame counter arranged in the back of a camera more convenient. In addition to having consumer appeal, a frame counter arranged in a back cover is typically larger than one located in the top of a camera. Therefore, a frame counter located in the back eliminates the need for a magnifying glass to view the frame number indicia of the counting means. Frame counters located in the back also provide more room in the top of the camera for other components of the camera.

This invention relates to a counter having these advantages and being driven by a new type of metering apparatus. More specifically, a metering apparatus that engages and disengages the counting means as film is transferred to the film cartridge and drives the counting means to indicate either the number of frames used or remaining. Unfortunately, no camera has been designed that has such a metering apparatus.

SUMMARY OF THE INVENTION

Accordingly, it is a present object of this invention to provide for a camera that has a metering apparatus that drives a counting means that is located in the back of a camera and is engageable and disengageable with the counting system as film is advanced in the camera.

In order to achieve the above and further objections of the invention, a camera includes a main body having a first cavity for receiving a film cartridge, a second cavity for receiving film withdrawn from the film cartridge and frame number indicia viewable by a user via a window in a back cover; a metering apparatus mounted within the main body for metering the film, one frame at a time, between the first and second cavities and across a film exposing area; the back cover covering the first and second cavities and the film exposing areas, the metering apparatus having a member that projects toward the back cover when the film is metered; and an indexable film frame counter disposed on the back cover and being engageable and disengageable by the member when the film is metered and indexing in response thereto to display a next frame number.

According to another aspect of this invention, the member extends through the film perforations to engage the frame counter when the film is metered and indexes in response thereto to display a next frame number, but is not capable of engaging the frame counter when portions of film having no apertures are disposed adjacent the film exposing area.

In a varied aspect of the invention, the member engages the frame counter without extending through the film and is driven by a rotational element engageable with the film perforations. Preferably, the indexable film frame counter is a rotatable disk having a plurality of apertures arranged adjacent a periphery thereof for engagement by the member.

These and various other advantages and features of novelty which characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described a preferred embodiment of the invention.

BRIEF DESCRIPTION OF THE DRAWINGS

FIG. 4 is a cross section taken along line 4—4 of FIG. 1 depicting a position of the metering apparatus;

FIG. 5 is a cross section taken along line 4—4 of FIG. 1 depicting another position of the metering apparatus;

FIG. 6 is a cross section taken along line 4—4 depicting a third position of the metering apparatus;

FIG. 7 is a cross section taken along line 4—4 depicting a fourth position of the metering apparatus;

FIG. 12 is a cross section taken along line 10—10 depicting a second position of the metering apparatus;

FIG. 13 illustrates a position of a frame counter corresponding to the position of the metering apparatus in FIG. 12;

FIG. 16 is a cross section taken along line 10—10 depicting a fourth position of the metering apparatus; and FIG. 17 illustrates a position of a frame counter corresponding to the position of the metering apparatus in FIG. 16.

DETAILED DESCRIPTION OF THE PREFERRED EMBODIMENTS

Figure 1:
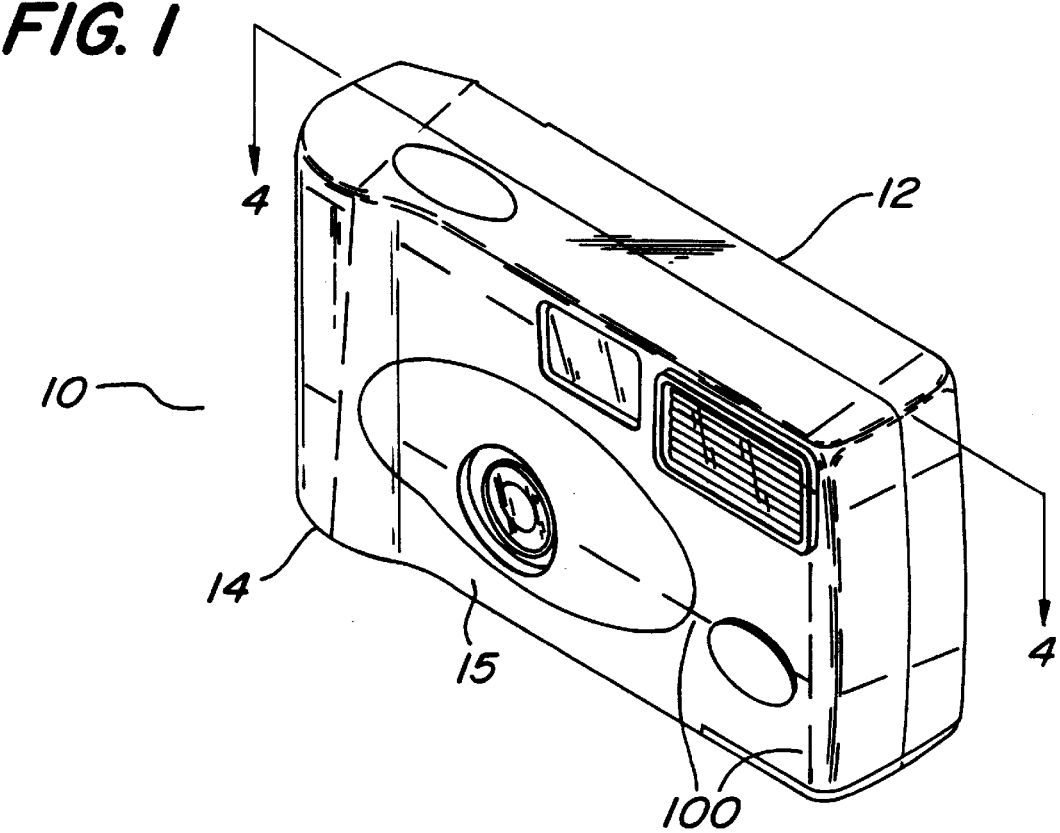
FIG. 1 is a front isometric view of a camera according to a preferred embodiment of this invention.

Referring now to the drawings, wherein like reference numerals designate corresponding structure throughout the views, and referring in particular to FIGS. 1–8, a camera 10 includes a main body 14 which has a first cavity 96 for receiving a film cartridge 22 and a second cavity 98 for receiving film 18 withdrawn from the film cartridge 22, a film exposing area 20 between the first cavity 96 and the second cavity 98, a metering apparatus 26 mounted on the main body 14 for metering the number of frames of film 18 moved across the film exposing area 20 and between the first cavity 96 and the second cavity 98, a metering member 28 contained within the metering apparatus 26 that projects towards a back cover 12; an indexable film frame counter 24 engageable and disengageable with the metering member 28 when the film 18 is metered and a back cover 12 covering the first cavity 96, the second cavity 98 and the film exposing area 20.

Figure 2:
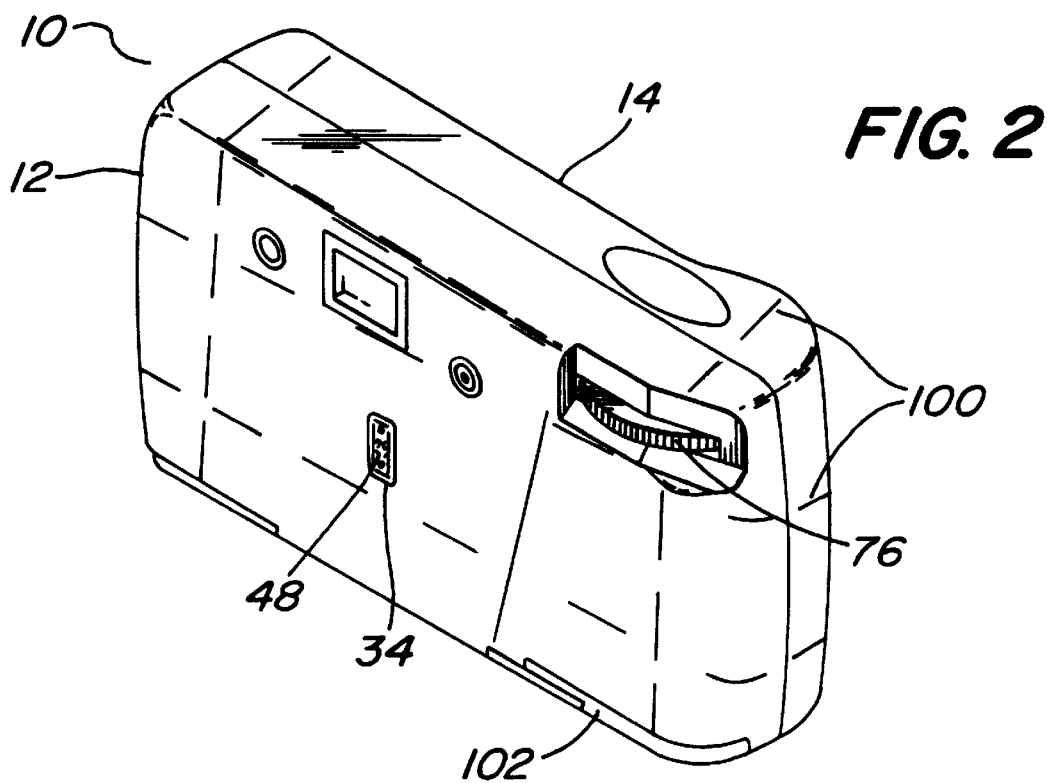
FIG. 2 is a back isometric view of the camera shown in FIG. 1.

In the illustrated embodiment of the camera 10 shown in FIGS. 1 and 2, the main body 14 also includes a front 15, or a front cover 15, of the camera 10. However, the term "main body," as used herein and in the appended claims, is not intended to be so limited. Except as otherwise noted, or as shown in the drawings, or except as the context and usage may indicate, the term "main body" is intended to mean both: (i) an inner body 17 of the camera 10, as herein described, with an integral front 15, or with the front cover 15 attached; and (ii) only the inner body 17 of the camera 10. Moreover, it is preferred that the embodiment of the camera 10 disclosed herein, including the front cover 15, back cover 12 and the main body 14 be manufactured from plastic.

Figure 3:
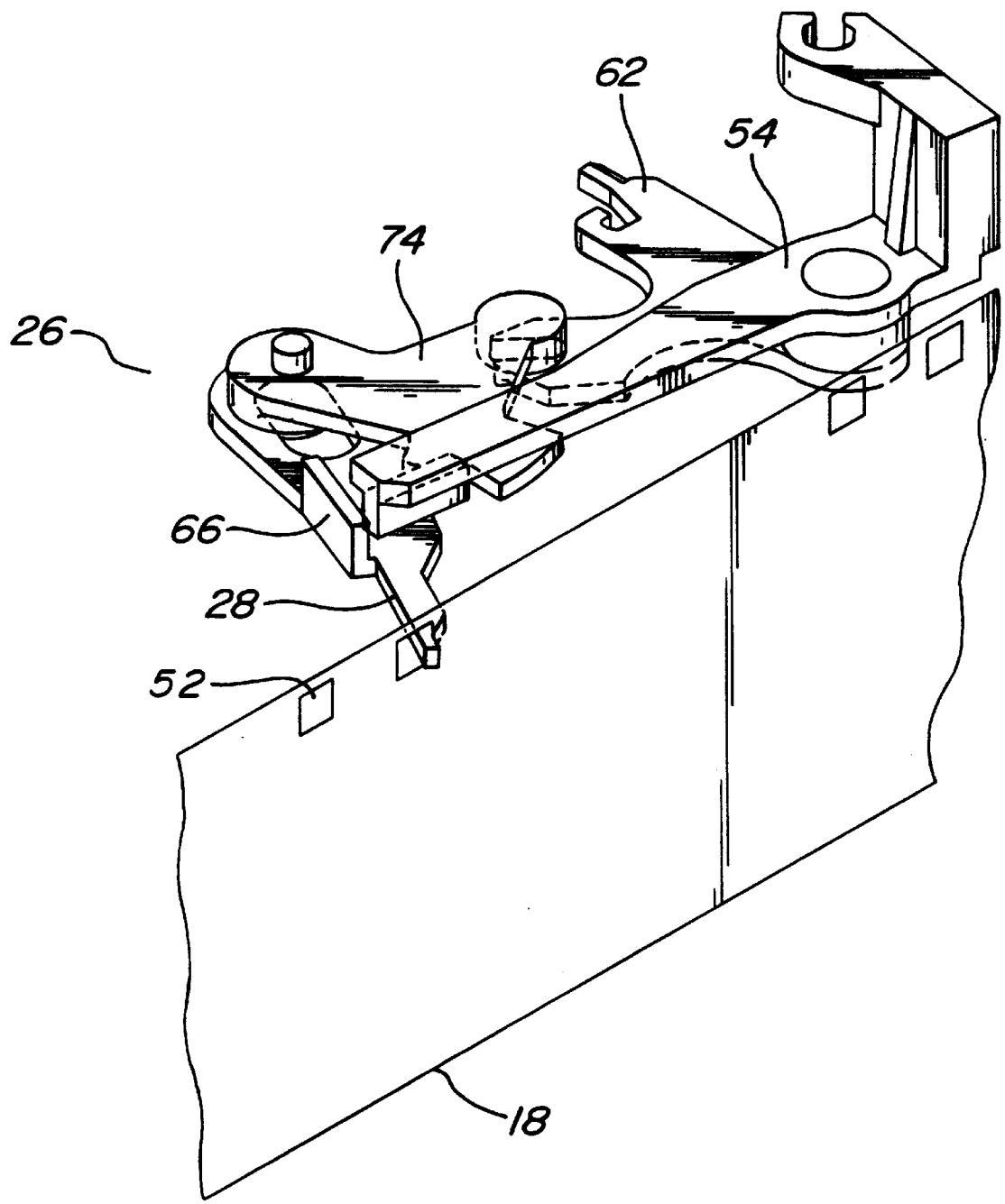
FIG. 3 is a perspective view of a metering system of the camera depicted in FIG. 1.
Figure 9:
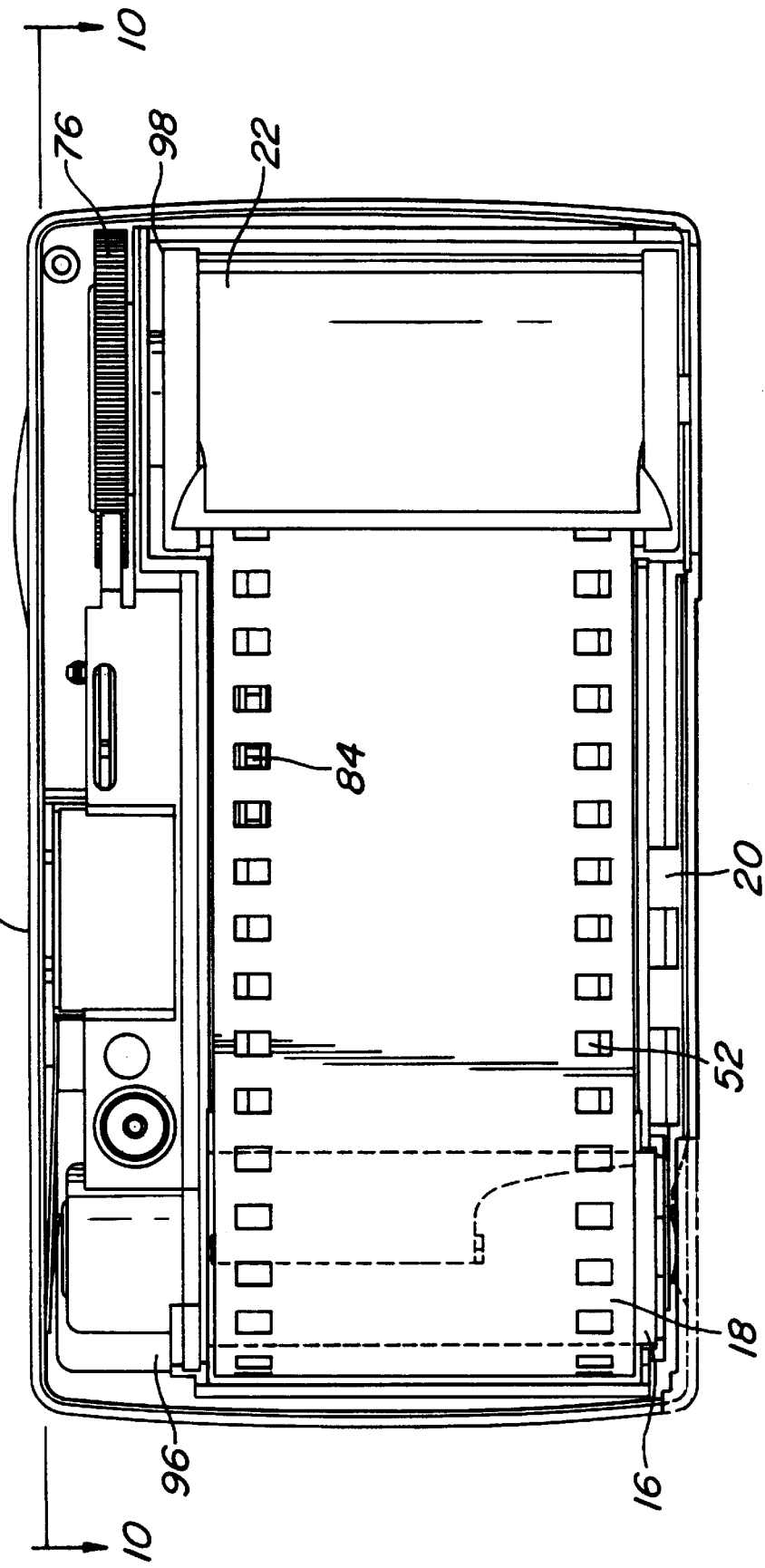
FIG. 9 is a cross section of a camera according to a second preferred embodiment of this invention.

The film 18 is made up of a plurality of frames. Each frame corresponds to a picture and is exposed in the exposing area 20 when a picture is taken. The film also has film perforations 52 which are driven with the film 18 as it moves between the cavities. This is illustrated in FIGS. 3 and 9.

As shown in FIGS. 4–9, the first cavity 96 has a film cartridge 22 loaded into the first cavity 96, and the second cavity 98 has a film spool 16. In this embodiment film 18 is transferred across the film exposing area 20 between the film cartridge 22 and the spool 16. However, it should be noted that this invention does not require a film spool 16 or a film cartridge 22. For instance, the film 18 could wrap around itself in one of the cavities instead of winding around the cartridge 22 or the spool 16.

FIGS. 2–8 show the camera 10 having an advance wheel 76 rotatably mounted to the main body 14 and mated with the film cartridge 22. In this embodiment, the advance wheel 76 can be rotated manually by a user. In other embodiments the advance wheel 76 may be motor driven. Since the advance wheel 76 is mated with a film cartridge 22, rotation of the advance wheel 76 will transfer film 18 between the first cavity 96 and the second cavity 98. Exactly how the advance wheel 76 drives the film 18 would be obvious to one skilled in the art and is therefore, not described any further in this application.

The indexable film frame counter 24, as is shown in FIG. 11, 13, 15 and 17, includes a counter disk 30 rotatably mounted on the back cover 12 and a plurality of apertures 36. Each of the apertures 36 is about the same distance from the center 38 of the counter disk 30 and is engageable one at a time with a metering member 28 of the metering apparatus 26. As shown in FIGS. 11, 13, 15 and 17 the indexable film frame counter 24 indicates the number of frames metered by the metering apparatus 26. In the preferred embodiment of this invention as each frame moves between the first cavity 96 and the second cavity 98, the metering apparatus 26 drives the indexable film frame counter 24 to indicate the number of frames transferred between the cavities. FIG. 9 depicts film 18 being transferred between the cavities and across the exposing area 20. FIG. 3 illustrates the film 18 being metered by the metering apparatus 26 as it crosses the film exposing area.

In the embodiment of this invention illustrated in FIGS. 3–8, the metering apparatus 26 includes a metering member 28, a metering finger pin 29, a first spring 56, an interlock lever 54, a second spring 58, a striker 62, a third spring 82 and an intermediate lever 74. In this embodiment the metering member 28 is a metering finger. As depicted in FIGS. 4–8, metering finger 28 is rotatably and translatably mounted on the main body 14. Additionally, the metering finger 28 is biased by the first spring 56 against the film 18 and is prevented from further rotation by pin 29.

The interlock lever 54 is biased by the second spring 58 away from the back cover 12 as is shown in FIGS. 4–8. The interlock lever 54 functions to control movement of the metering finger 28 in response to the intermediate lever 74. FIGS. 5 and 6 depict the striker 62 biased by a third spring 82 towards the film spool 16 and intermediate lever 74 engaged with striker 62. Intermediate lever 74 is rotatably mounted to the main body about the same pivot point as the metering finger 28. As detailed below and as shown in FIGS. 4–9, the function of the intermediate lever 74 is to control the interlock lever 54. The striker 62 operates in conjunction with the shutter which is not shown and would be obvious to one skilled in the art.

During operation of the camera, film 18 is moved from the spool 16 to the film cartridge 22 with the advance wheel 77. As this occurs, the components of the metering apparatus 26, the film 18 and the advance wheel 76 drive the metering finger 28 to form a square like pattern. As the metering finger 28 follows this pattern, it also drives the counter disk 30. Operation of the metering finger 28 is shown in FIGS. 4–9.

FIG. 4 illustrates the initial position of the metering apparatus components with film loaded into the camera 10 before a picture is taken. As shown in FIG. 4, the metering finger 28 biased by first spring 56 is prevented from rotating by the metering pin 29. In this position, the metering finger 28 rests against the film 18 and does not extend through the film perforations 52. Additionally, striker 62 and intermediate lever 74 are prevented from rotating against the force of third spring 82 by the interlock lever 54. Interlock lever 54 prevents these elements from rotating because it is biased by second spring 58 against the intermediate lever 74. More specifically, tab 59 of interlock lever 54 rests against the intermediate lever 74 and prevents it from rotating.

When a picture is taken, the interlock lever 54 is rotated counter clockwise against the force of second spring 58, as shown by an arrow in FIG. 5. The device that operates the interlock lever 54 is not shown because it would be obvious to one skilled in the art. As the interlock lever 54 rotates counter clockwise, tab 59 releases the intermediate lever 74. Once released, the third spring 82 forces the intermediate lever 74 to rotate clockwise as shown by the arrow in FIG. 5. As the intermediate lever 74 is released, the striker 62 coupled to the intermediate lever 74 also rotates. However, the striker 62 rotates in the counter clockwise direction as depicted by the arrow in FIG. 5. As the intermediate lever 74 rotates, it engages the tab 59 of the interlock lever 54. Once engaged with the tab 59, the interlock lever 54 is prevented from rotating in the clockwise direction.

Figure 8:
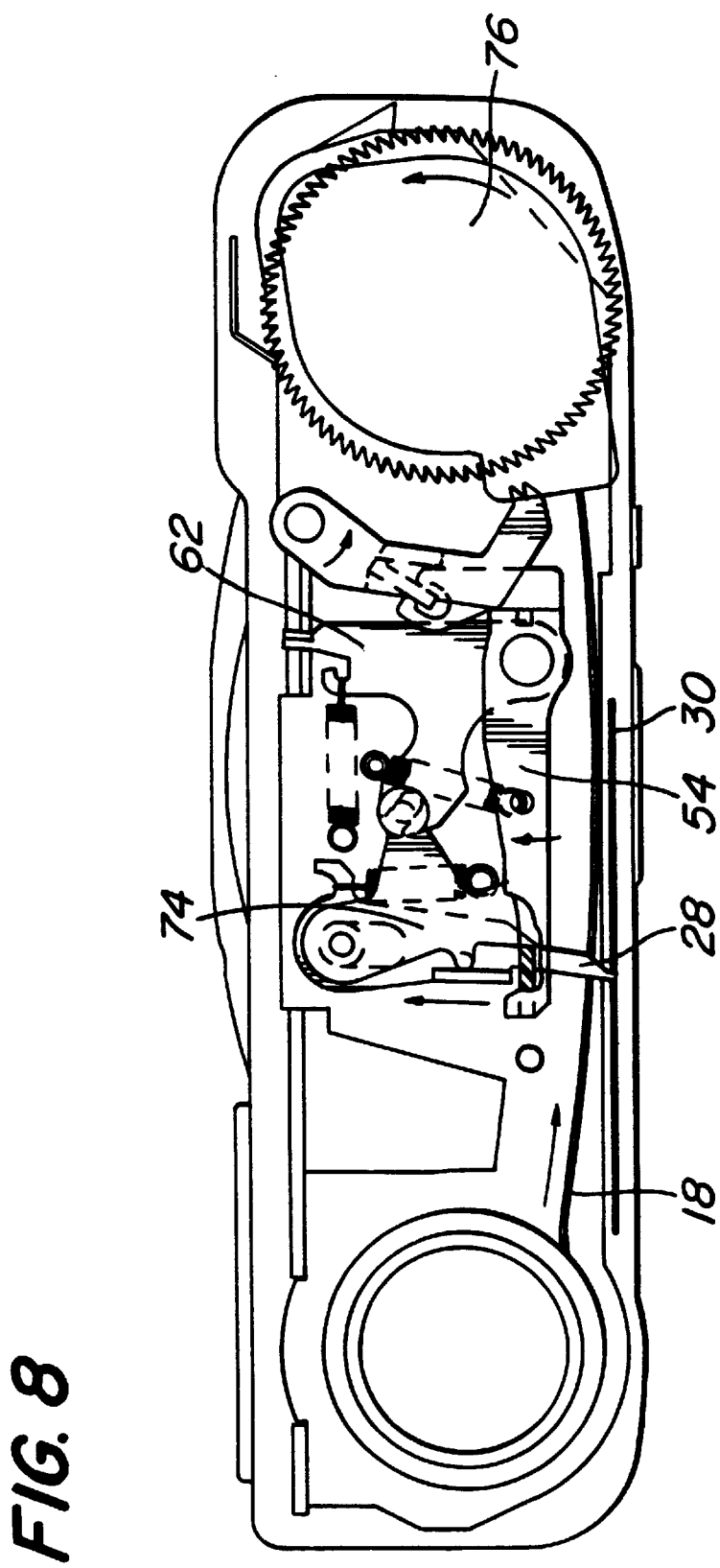
FIG. 8 is a cross section taken along line 4—4 illustrating the metering apparatus driving the frame counter.

After a picture is taken, the advance wheel 76 is rotated, as indicated by the arrows in FIGS. 6–8, to advance the film 18 to the next frame. As described above, when the advance wheel 76 is operated, film 18 moves from the film spool 16 to the film cartridge 22 as indicated by an arrow in FIGS. 6, 7 and 8. As the film moves, one of the perforations 52 in the film 18 reaches the metering finger 28. The metering finger 28 then engages and extends through the film perforation 52. The film 18 then pulls the metering finger 28 towards the film cartridge 22. The translational movement of the finger 28 through a perforation 52 is indicated by an arrow in FIG. 6, and the rotational movement of the finger 28 is illustrated by an arrow in FIG. 7.

As the metering finger 28 moves with the film perforations 52 it drives the intermediate lever 74 in a counter clockwise direction as depicted with an arrow in FIG. 7. Since the intermediate lever 74 is coupled to the striker 62, it causes the striker 62 to rotate clockwise as shown by an arrow in FIG. 7. As the intermediate lever 74 rotates, it releases the interlock lever 54. This is also shown in FIGS. 7 and 8 and with an arrow in FIG. 8. When the interlock lever 54 is released it pushes the metering finger 28 away from the back cover 12, as shown by an arrow in FIG. 8. When the metering finger 28 moves away from the back cover 12, it also moves out of the film perforations 52.

Once out of the film perforations 52, biasing spring 56 then causes the finger 28 to rotate clockwise back toward the film spool 16. The finger 28 rotates until it rests against the pin 29 and is back in its initial position shown in FIG. 4. After this movement, the metering finger 28 has moved in a square like pattern.

When the metering finger 28 moves in this square like pattern, it also drives the counter disk 30 of the indexable film frame counter 24 in a rotational direction. As mentioned above, the metering finger 28 extends through a film perforation 52 as film 18 is being advanced from the film spool 16 to the film cartridge 22. In addition to this, the metering finger 28 further extends through one of the apertures 36 of the counter disk 30 as the finger 28 moves towards the film cartridge 22. This is shown in FIGS. 7 and 8. More specifically, as the metering finger 28 moves towards the film cartridge 12, it rotates the counter disk 30 clockwise. When the metering finger 28 moves out of the film perforations 52 as described above, it also moves out of the aperture 36. In summary, when the metering finger 28 moves toward the film cartridge 22, it also causes the counter disk 30 to rotate.

FIGS. 11, 13, 15, and 17 illustrate the film frame counter 24 according to a preferred embodiment of this invention. In this preferred embodiment, each of the apertures 36 are spaced around the periphery 42 of the counter disk 30 and are about equally radially spaced from the center 38 of the counter disk 30. As discussed above, the counter disk 30 rotates the angular distance 40 for the movement of one frame between the film spool 16 and the film cartridge 22 across the exposure area 20. Consequently, the angular distance 40 is proportional to the linear distance that a frame travels when it is transferred between the film spool 16 and the film cartridge 22.

The counter disk 30 also includes frame number indicia 48 imprinted on the surface of the counter disk 30. The indicia 48 are also equally radially spaced from the center 30 of the disk and arranged about the periphery 42 of the disk 30. As detailed above, the metering finger 28 rotates the counter disk 30 one aperture 36 for each frame transferred between the film spool 16 and the film cartridge 22. As the disk 30 rotates one aperture 36, it also rotates to show the next indicia 48. Therefore, when the counter disk 30 rotates one aperture 36 for each frame transferred, the counter disk 30 also rotates to show the next number 48 imprinted on its surface 46.

In the preferred embodiment the indicia 48 correspond to the number of pictures remaining to be taken. In another preferred embodiment, the indicia 48 refers to the number of pictures taken. The camera 10 may also have a viewing window 34 in the back cover 12 for viewing the indica 48.

Figures 10, 11:
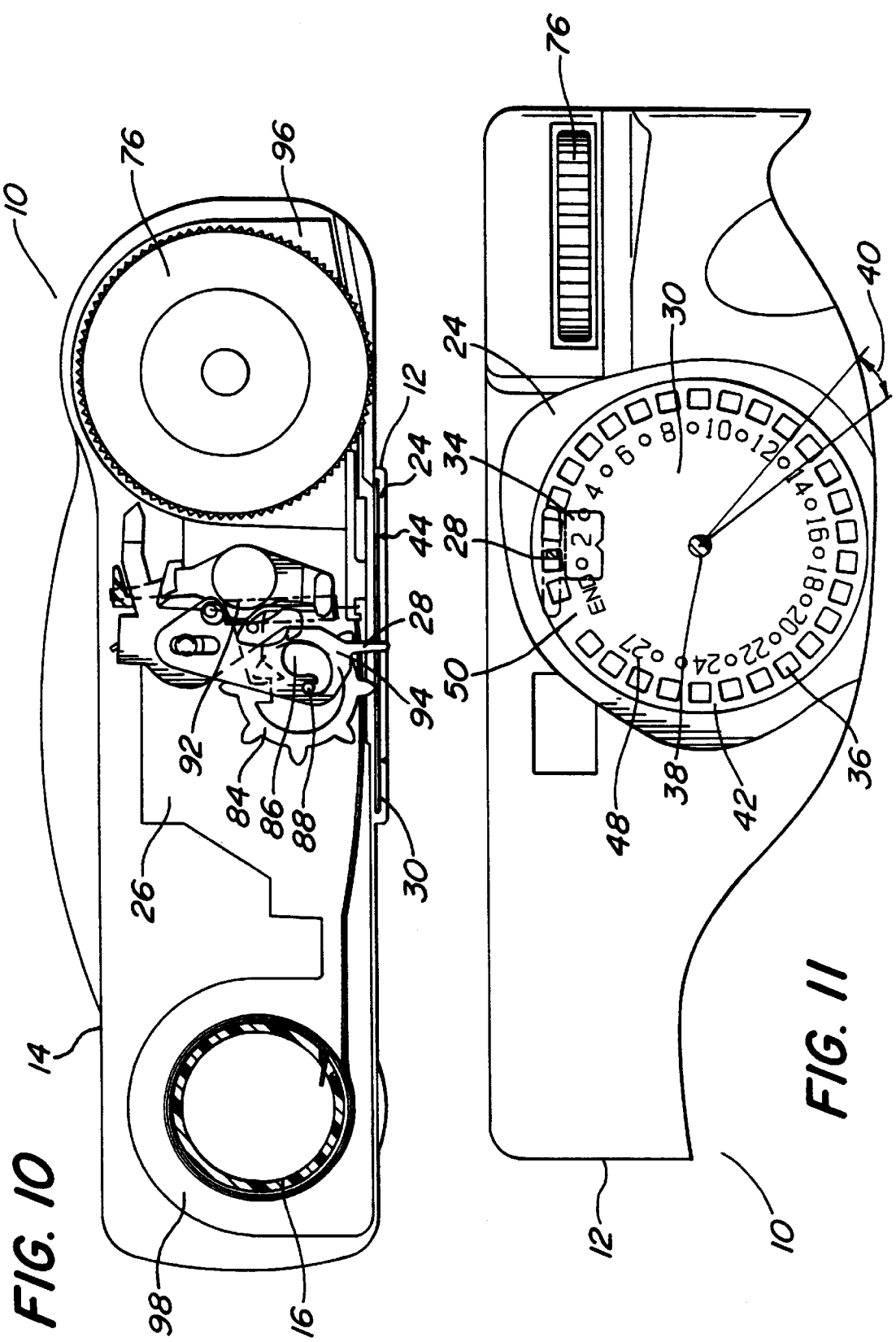
FIG. 10 is a cross section taken along line 10—10 illustrating a first position of the metering apparatus.
FIG. 11 illustrates a position of a frame counter corresponding to the position of the metering apparatus in FIG. 10.

The camera 10 may also include a friction means 44 located on the back cover 12 and resting against the surface of the counter disk 30. The friction means 44, as shown in FIG. 10, prevents rotation of the counter disk 30 when the metering finger 28 does not extend through one of the apertures 36.

This invention may include other metering apparatuses 26 that are capable of driving the counter disk 30 located in the back 12 of a camera 10. For example, one such metering apparatus 26 uses a sprocket engageable with the film perforations 52 that drives a metering member 28. In this apparatus, the metering member 28 does not engage the perforations 52. Rather, the metering member 28 simply drives the indexable film frame counter 24.

According to a second preferred embodiment of this invention, a metering apparatus 26 uses a metering sprocket 84 as depicted in FIGS. 9–17. As shown in FIGS. 9–17, this metering apparatus 26 includes a metering sprocket 84, a metering sprocket shaft 86, a driving pin 88, a metering member 28, a metering spring 92 and a metering member cam 94. In this embodiment, the metering member 28 is a counting finger and is rotatably and translatably mounted to the main body 14. The metering sprocket 84 is rotatably mounted to the main body 14 on the metering sprocket shaft 86 and engages the film perforations 52 to meter the movement of a frame between the film spool 16 and the film cartridge 22. Driving pin 88 is rotatably mounted to the sprocket shaft 86 and is offset from the center of the sprocket shaft 86.

As shown in FIGS. 9–17, the driving pin 88 is engageable and disengageable with the metering member cam 94. Metering member cam 94 is attached to the metering finger 28 and drives the member 28 in response to the driving pin 88. The metering finger spring 92 biases the counter finger 28 towards the back cover 12.

FIGS. 10–17 illustrate the operation of this second preferred embodiment of this metering apparatus 26. In operation, the film 18 drives the metering sprocket 84, and the metering sprocket 84 drives the metering finger 28. More specifically, after a picture is taken with the camera 10, one frame of film 18 is transferred from the film spool 16 to the film cartridge 22 with the advance wheel 76 as described above. Since the metering sprocket 84 is engaged with the perforations 52, the movement of the film 18 drives the sprocket 84 in a rotational direction.

FIGS. 10 and 11 show the initial position of the metering finger 28 with the film 18 loaded into the camera 10. In this position, the metering finger 28 is engaged with the counter disk 30 of the frame counter 24 and extends through one of the apertures 36. FIG. 11 depicts the metering finger 28 extending through one of the apertures. In this position the indicia 48 indicates one frame remaining.

After a picture is taken, the film 18 is advanced. Since the sprocket 84 is engaged with the perforations 52, the sprocket 84 begins to rotate counter clockwise. Since the sprocket shaft 86 and its attached driving pin 88 are attached to the sprocket 84, the shaft 86 and pin 88 also rotate counter clockwise. As mentioned above, as the driving pin 88 rotates, the pin 88 drives the metering member cam 94. The cam 94 then rotates the attached finger 28, and the finger 28 rotates the disk 30. This is illustrated in FIGS. in 12 and 13 which show the disk 30 rotated as the film 18 is advanced.

Figure 14:
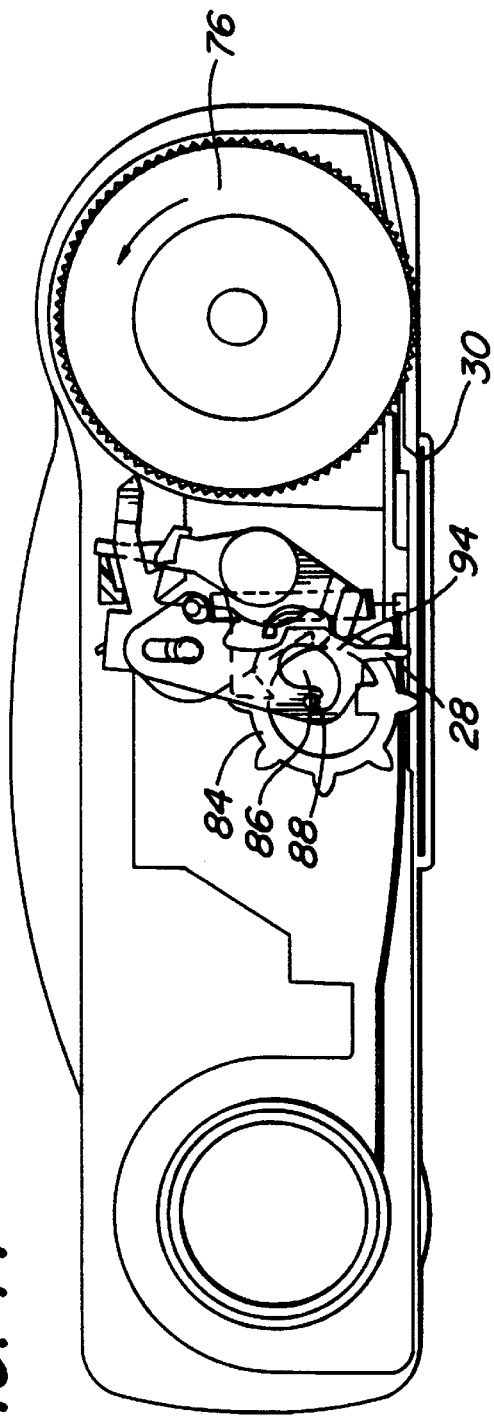
FIG. 14 is a cross section taken along line 10—10 depicting a third position of the metering apparatus.
Figure 15:
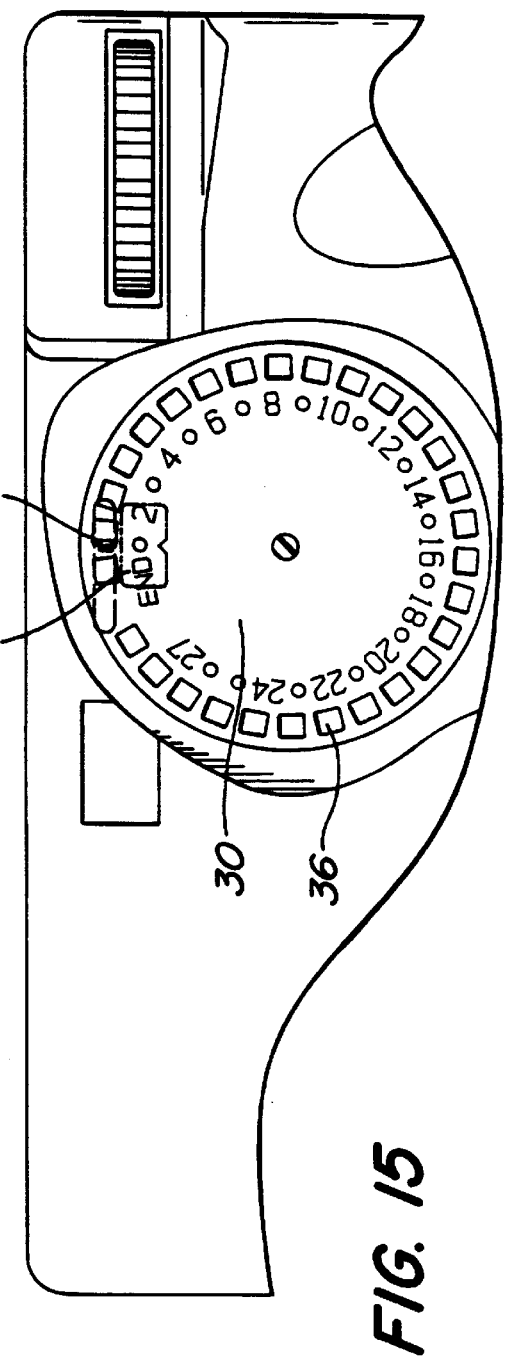
FIG. 15 illustrates a position of a frame counter corresponding to the position of the metering apparatus in FIG. 14.

As the film 18 is advanced one frame, as shown by an arrow in FIGS. 14 and 16, the sprocket 84 makes one revolution. The sprocket 84 drives the finger 28 to move in a series of strokes that traces an elliptically shaped pattern. As the finger 28 traces this pattern, it becomes disengaged with the aperture 36 and rotates back towards its initial position as shown in FIGS. 14 and 15. After tracing this pattern, the finger 28 is in either the position shown in FIGS. 10 or if the picture was the last picture the finger 28 is in the position shown in FIG. 16. Additionally, the counter disk 30 has been rotated the angular distance 40 to the next aperture or to the end of the disk as shown in FIG. 17. In summary, as one frame is moved between the spool 16 and the cartridge 22, the metering finger 28 travels one revolution and traverses an elliptical pattern.

As noted in FIG. 17, the counter disk 30 may also include a solid portion 50 which is spaced about the same distance from the center of the disk 38 as the apertures 36. The solid portion rests against the metering finger 28 after all of the pictures have been taken and the film has been transferred from the film spool 16 to the film cartridge 22. The purpose of the solid portion 50 is to prevent further rotation of the counter disk 30 after all of the pictures have been taken. By resting the metering finger 26 against a solid portion, the metering finger 28 can no longer rotate the counter disk 30 because it is not engaged with one of the apertures 36.

As is noted by a comparison of FIGS. 10 and 16, when the finger 28 rests against the solid portion 50, the finger 28 is slightly biased away from the back cover 12. If any film 16 is advanced while the metering finger 28 rests against the solid portion 50 of the disk, the driving pin 88 will rotate into the larger portion of the cam 94 as shown in FIG. 16 and will not drive the finger 28. Once in this larger portion, the pin 88 will no longer drive the cam 94. Consequently, while the finger 28 rests against the solid portion 50, advancement of film 18 will rotate the driving pin 88, but will not move the finger 28.

This invention applies to single use cameras as well as reusable cameras. Additionally, it includes but is not limited to cameras that use conventional 35 mm film, as shown in FIG. 9, and Advanced Photo System film, shown in FIG. 3, contained within a film cartridge with a light lock door. KODAK® brand ADVANTIX® film is an example of Advanced Photo System film.

Although FIGS. 1 and 2 depict the camera 10 as a single use camera this invention is not limited to single use cameras. This invention also includes reusable cameras. As illustrated in FIGS. 1 and 2, a single use camera 10 may include, as is indicated in heavy dotted lines 100, exemplary packaging, such as adhesive backed paper, cardboard, or even a plastic material, that is typically used on a single use camera. As is known in the art, such packaging must be removed, by at least partial destruction thereof, to open or disassemble the camera for the purpose of removing a film cartridge or reloading film. According to the practice of the present invention in a single use camera, it is preferred that such packaging cover at least the tab 102 and a portion of the back cover 12 so that destruction of at least part of the packaging must occur to remove the back cover 12 and/or the film cartridge 22. Although some single use cameras can be re-cycled, those skilled in the art will realize that re-loading film therein usually requires removal of the back cover 12, and hence requires destruction of the packaging. In some cases, removal of the back cover 12 either cannot be performed easily, or its removal also results in partial destruction of the camera body.

Other portions of the camera 10 illustrated in the drawings are well known in the art, and no further explanation thereof is required.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

What is claimed is:

1. A camera that has a back that is defined by an area that is disposed closer to an eye of a camera user than any another portion of the camera when the user is taking a picture and a top that intersects the back, comprising:

a main body having a first cavity for receiving a film cartridge, a second cavity for receiving film withdrawn from the film cartridge and a film exposing area disposed between the first and second cavities;

a back cover that covers the first and second cavities and the film exposing area, the back cover comprising a surface that has an outer side that forms at least a portion of the back of the camera and an inner side that opposes the outer side;

metering means mounted within the main body for metering the film, one frame at a time, as it moves between the first and the second cavities and across the film exposing area, the metering means comprising a member that projects towards the back cover when the film is metered;

an indexable film frame counter disposed on the inner side of the surface of the back cover and being engageable and disengageable by the member when the film is metered and indexing in response thereto to display a next frame number; and frame number indicia, disposed on the indexable film frame counter, which are viewable by the user via a counter window disposed in the back cover.

2. The camera as described in claim 1, wherein the member is arranged to engage apertures in portions of the film disposed adjacent the film exposing area to meter the film in response to a driving force applied to the metering means, the member extending through the film apertures to engage the frame counter, but not being capable of engaging the frame counter when portions of film having no apertures are disposed adjacent the film exposing area.

3. The camera as described in claim 2 further comprising a film cartridge disposed in the first cavity and non-exposed film disposed in the second cavity, the back cover being securely, light tightingly affixed to the main body, the camera being a single use camera wherein the film cartridge is removable only by means of destruction of at least a portion the camera.

4. The camera as described in claim 2, wherein the counter comprises a rotatable disk having a periphery, a region adjacent to the periphery and a plurality of apertures disposed on the region that are each engageable with the member.

5. The camera as described in claim 4, wherein the frame number indicia are angularly spaced about the periphery of the disk, and the angular spacing there between is proportional to a distance between adjacent frames of film.

6. The camera as described in claim 4, further comprising a friction means located between the back cover and the disk to prevent rotation of the disk when the member is not in engagement with one of the disk apertures.

7. The camera as described in claim 4, wherein the disk apertures extend only partially around the region adjacent to the periphery of the disk and are arranged such that the member cannot engage any disk apertures, and cannot rotate the disk, after the disk has been rotated to a preselected position.

8. The camera as described in claim 2, wherein the metering means further comprises a user accessible, user rotatable, thumb wheel, the driving force being applied by rotation of the thumb wheel.

9. The camera as described in claim 1, wherein the member is driven by a rotational element engageable with portions of the film disposed adjacent the film exposing area to meter the film in response to a driving force applied to the film.

10. The camera as described in claim 9 further comprising a film cartridge disposed in the first cavity and non-exposed film disposed in the second cavity, the back cover being securely, light tightingly affixed to the main body, the camera being a single use camera wherein the film cartridge is removable only by means of destruction of at least a portion the camera.

11. The camera as described in claim 9, wherein the counter comprises a rotatable disk having a periphery, a region adjacent to the periphery and a plurality of apertures disposed on the region that are each engageable with the member.

12. The camera as described in claim 11, wherein the frame number indicia are angularly spaced about the periphery of the disk, and the angular spacing there between is proportional to a distance between adjacent frames of film.

13. The camera as described in claim 11, further comprising a friction means located between the back cover and the disk to prevent rotation of the disk when the member is not in engagement with one of the disk apertures.

14. The camera as described in claim 11, wherein the disk apertures extend only partially around the region adjacent to the periphery of the disk and are arranged such that the member cannot engage any disk apertures, and cannot rotate the disk, after the disk has been rotated to a preselected position.

15. The camera as described in claim 9, wherein the metering means further comprises a user accessible, user rotatable, thumb wheel, the driving force being applied by rotation of the thumb wheel.

16. A camera comprising:
a main body having a first cavity for receiving a film cartridge and a second cavity for receiving film withdrawn from the film cartridge;

metering means mounted within the main body for metering the film, one frame at a time, between the first and second cavities and across a film exposing area;

a back cover covering the first and second cavities and the film exposing area;

an indexable film frame counter disposed on the back cover;

a member, disposed within the metering means, that projects towards the back cover when the film is metered and that is arranged to engage apertures in portions of the film disposed adjacent the film exposing area to meter the film in response to a driving force applied to the metering means, the member extending through the film apertures to engage the frame counter when the film is metered and indexing the frame counter in response to the metering of the film to display a next frame number, but not being capable of engaging the frame counter when portions of film having no apertures are disposed adjacent the film exposing area; and frame number indicia disposed on the indexable film frame counter that are viewable by a user via a counter window in the back cover.

17. The camera as described in claim 16, wherein the counter further comprises a rotatable disk having a periphery, a region adjacent to the periphery and a plurality of apertures disposed on the region that are each engageable with the member and wherein the frame number indicia are angularly spaced about the periphery of the disk, and the angular spacing there between is proportional to a distance between adjacent frames of film.

18. The camera as described in claim 17 further comprising a film cartridge disposed in the first cavity and non-exposed film disposed in the second cavity, the back cover being securely, light tightingly affixed to the main body, the camera being a single use camera wherein the film cartridge is removable only by means of destruction of at least a portion the camera.

19. A camera that has a back that is defined by an area that is disposed closer to an eye of a camera user than any another portion of the camera when the user is taking a picture and a top that intersects the back, comprising:
a main body having a first cavity for receiving a film cartridge and a second cavity for receiving film withdrawn from the film cartridge;

metering means mounted within the main body for metering the film, one frame at a time, between the first and second cavities and across a film exposing area;

a back cover that covers the first and second cavities and the film exposing area, the back cover comprising a surface that has an outer side that forms at least a portion of the back of the camera and an inner side that opposes the outer side;

an indexable film frame counter, disposed on the inner side of the surface of the back cover, comprising a rotatable disk that has a periphery, a region adjacent to the periphery and a plurality of apertures disposed on the region, the apertures being engageable and disengageable by a member of the metering means when the film is metered and indexing the rotatable disk in response to the metering of the film to display a next frame number;

frame number indicia disposed on the indexable film frame counter which are viewable by the user via a counter window in the back cover; and the metering means member projecting toward the back cover when the film is metered and being driven by a rotational element engageable with portions of the film disposed adjacent the film exposing area to meter the film in response to a driving force applied to the film.

20. The camera as described in claim 19, further comprising a film cartridge disposed in the first cavity and non-exposed film disposed in the second cavity, the back cover being securely, light tightingly affixed to the main body, the camera being a single use camera wherein the film cartridge is removable only by means of destruction of at least a portion the camera.

21. The camera of claim 19, wherein the frame number indicia are angularly spaced about the periphery of the disk, and the angular spacing there between is proportional to a distance between adjacent frames of film.

22. The camera of claim 19, further comprising a friction means located between the back cover and the disk to prevent rotation of the disk when the member is not in engagement with one of the disk apertures.

23. The camera of claim 19, wherein the disk apertures extend only partially about the region and are arranged such that the member cannot engage any disk apertures, and cannot rotate the disk, after the disk has been rotated to a preselected position.

24. The camera of claim 19, wherein the metering means further comprising a user accessible, user rotatable, thumb wheel, the driving force being applied by rotation of the thumb wheel.

* * * * *